Jan. 31, 1939.　　　　J. JAMIESON　　　　2,145,725
APPARATUS FOR CUTTING SHEET METAL OR OTHER SHEET MATERIAL
Filed July 19, 1938　　　3 Sheets-Sheet 1
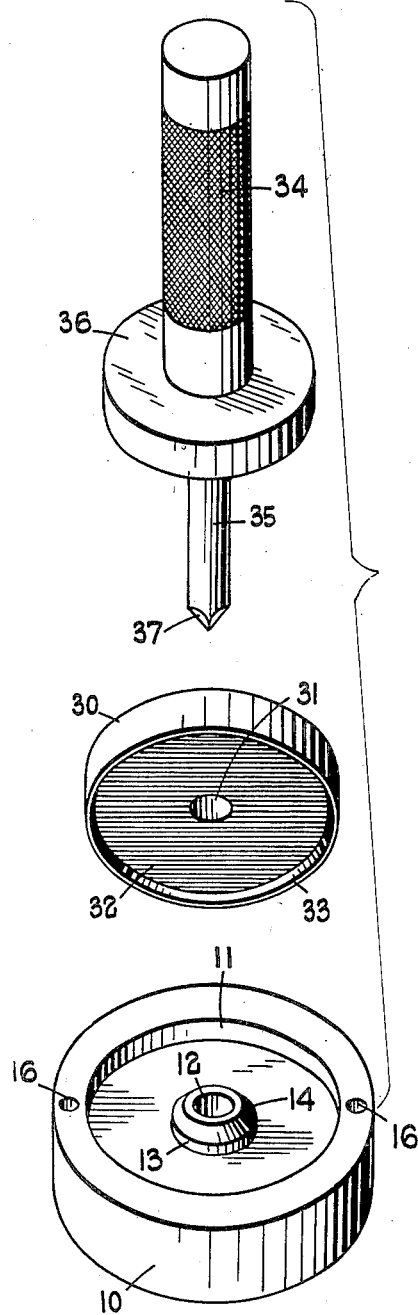
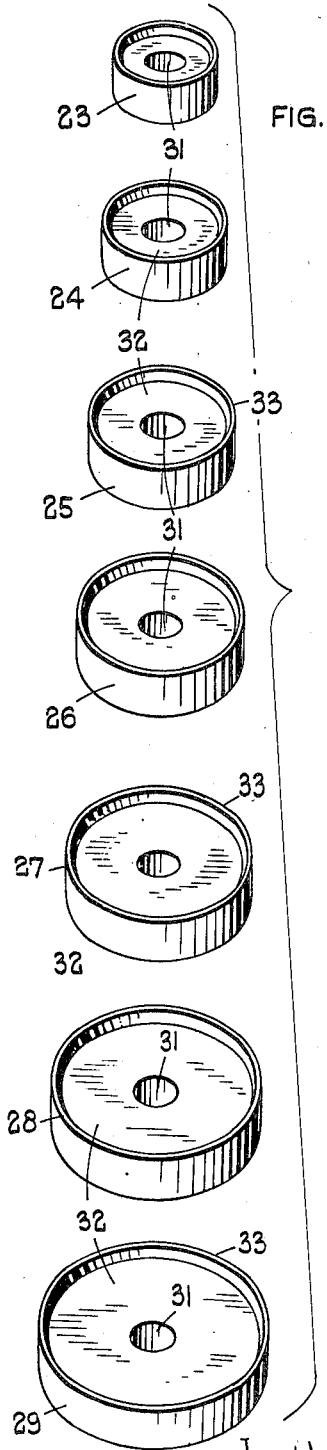
Joseph Jamieson
Inventor Jan. 31, 1939. J. JAMIESON 2,145,725
APPARATUS FOR CUTTING SHEET METAL OR OTHER SHEET MATERIAL
Filed July 19, 1938 3 Sheets-Sheet 2

Joseph Jamieson
Inventor
Attorneys

Jan. 31, 1939.   J. JAMIESON   2,145,725
APPARATUS FOR CUTTING SHEET METAL OR OTHER SHEET MATERIAL
Filed July 19, 1938   3 Sheets-Sheet 3

Joseph Jamieson
Inventor
Taubman & Taubman
Attorneys

Patented Jan. 31, 1939

2,145,725

UNITED STATES PATENT OFFICE 2,145,725

APPARATUS FOR CUTTING SHEET METAL OR OTHER SHEET MATERIAL

Joseph Jamieson, Rozelle, Sydney, Australia, assignor to The Tool & Engineering Co. Pty. Ltd., Glebe, Sydney, Australia Application July 19, 1938, Serial No. 220,141
In Great Britain July 9, 1937

7 Claims. (Cl. 164—32)

This invention relates to apparatus for cutting sheet metal or other sheet material and particularly concerns apparatus for cutting out discs or washers or for cutting holes in sheets.

Referring to the drawings:—

Figure 1 illustrates in perspective parts of one form of the present invention.

Figure 2 shows in perspective a range of male dies for use in the apparatus shown in Figure 1.

Figure 3:
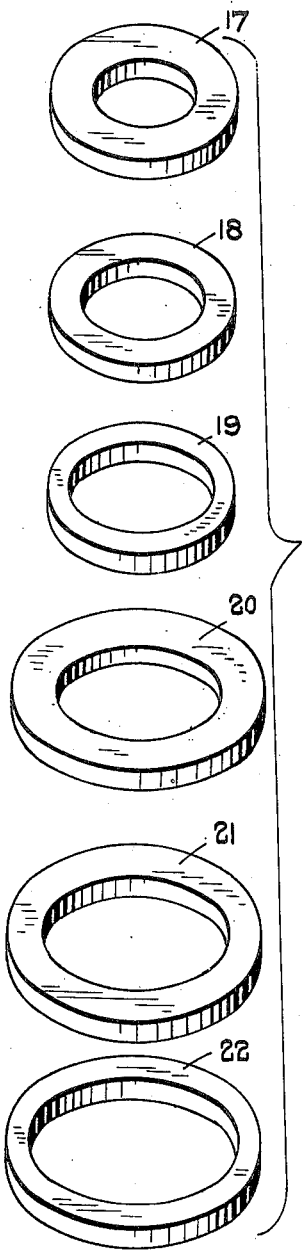
Figure 3 shows a range of female dies corresponding with the male dies shown in Figure 2.

In the construction illustrated in Figures 1 to 6 of the accompanying drawings the apparatus includes a master die or block 10 in the form of a steel disc of substantial thickness, this disc being provided in one flat face with a cylindrical recess 11 and with a central cylindrical hole 12 extending axially through the disc.

Disposed concentrically around the hole is an upstanding boss 13 which projects from the flat base of the recess 11 for a height corresponding with the depth of the recess 11 so that the top of the boss 13 is disposed in the plane of the flat face of the block in which the recess 11 is formed.

The top outer edge of the boss 13 is chamfered to form an inclined conical shoulder 14.

In the opposite flat face of the block is formed a further recess 15 corresponding with the recess 11 but of smaller diameter and at the centre of this recess 15 is a boss 13 corresponding exactly with the boss projecting into the recess 11.

The block is provided with holes 16 for screws, bolts or other members for fastening the master die on a suitable support.

A plurality of female dies or rings are adapted to fit within the recess 11 and whilst, if desired, the rings or some of the rings may be arranged to fit in the recess 15, it is preferred that all the rings either fit directly into the recess 11 or nest one within another in the recess 11.

Each female die is of annular form and the inner peripheral wall is of cylindrical or parallel sided form so that either of the edges of this wall can be used as the cutting edge of the die. The range of female dies indicated by the reference numerals 17 to 22 inclusive are of different internal diameters and vary in predetermined steps over a given range of sizes.

Each of the dies 20, 21 and 22 is adapted to fit closely within the recess 11, whilst each of the dies 17, 18 and 19 is adapted to nest within the die 21.

Each die is formed so that, whilst readily removable, it is, when mounted in position, located accurately relative to the hole 12 and without looseness or play. The recesses 11 and 15 may each be parallel sided, i. e. with its sides disposed parallel to the axis of the hole 12, or alternatively, the boundary wall of the recess 11 may be slightly undercut. Correspondingly each female die may be provided with only one cutting edge with the inner peripheral wall slightly undercut from this edge so as to facilitate the operation of the die.

A plurality of male dies indicated in Figure 2 co-operate with the female dies, these male dies being indicated by the reference numerals 23 to 29 inclusive in Figure 2 and the numeral 30 in Figure 1.

Each male die is in the form of a thick disc or washer having at its centre an axial hole 31 of diameter corresponding with that of the hole 12 in the master die 10, the disc being recessed at 32 from one face to form an annular cutting portion 33 around the periphery of this face.

A holder for the male dies includes a stem or handle 34 and in axial alignment therewith a guide pin 35 adapted to fit the holes 12 and 31, whilst at the junction of the handle and guide pin is a collar 36 to form an abutment or flange against which can seat a male die threaded upon the guide pin 35.

The male dies 23 to 28 correspond respectively with the female dies 17 to 21, whilst the recesses 15 and 11 form the female dies for the male dies 29 and 30 respectively.

Each male die is adapted to fit slidably within the cutting edge of the corresponding female die and the cutting action takes place between the outer peripheral edge on the cutting portion 33 of the male die and the uppermost cutting edge on the inner periphery of the female die.

In the construction illustrated the apparatus is adapted for operation by hand but if designed for operation in a press or like machine the handle 34 may be omitted and the collar 36 may be fixed to or mounted on the plunger or movable part of the press, whilst the master die is fixed to or mounted upon the bed or other stationary part of the press.

In the construction illustrated the stem or handle may be integral with the guide pin and the collar 36 may then be forced on to the guide pin and against the shoulder formed between the guide pin and the stem or handle.

The handle is knurled or roughened to provide a grip portion and the projecting end of the guide pin is formed into a piercing point 37.

One method of operating the apparatus is as follows:—

A hole is first pierced in the sheet at a position corresponding with the centre of the hole to be cut and for this purpose the sheet is placed either directly upon the master die 10 or upon a block of wood or other relatively soft material and using the pointed end 37 of the guide pin as a punch a depression is formed in the sheet by striking the end of the stem or handle 34 with a hammer. The plate is then positioned with the dent immediately above the hole 12 in the master die and one or more further blows are struck on the end of the stem or handle 34 until the point 37 pierces the sheet and cuts therein a hole of diameter corresponding with that of the guide pin. The edge of the hole 12 in the master die forms a cutting edge for cooperation with the pointed end 37 of the guide pin during this piercing operation.

Figure 4:
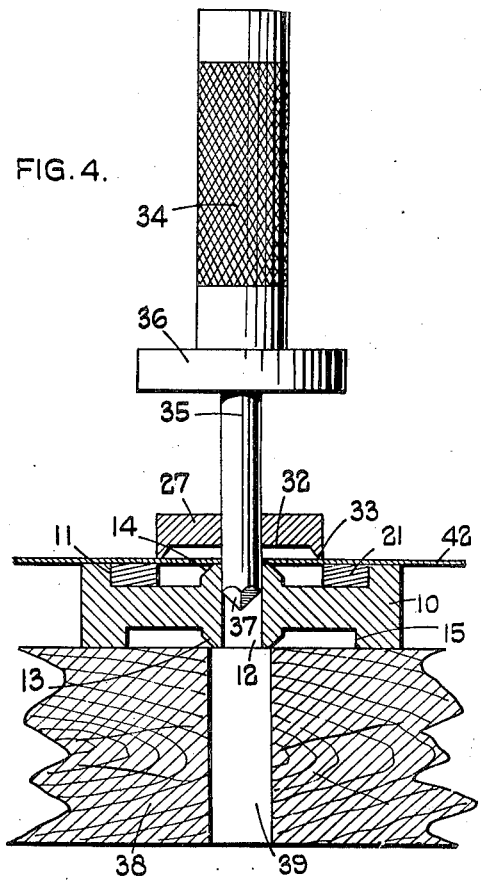
Figure 4 is a sectional elevation showing in operation the apparatus indicated in Figure 1.

Assuming that it is desired to form in the sheet a hole of diameter corresponding with that of the die 30, the latter is then threaded upon the guide pin which in turn is threaded through the hole in the sheet and through the hole 12 in the master die, which latter is either fixed or supported upon a suitable bed or block indicated at 38 in Figure 4 and provided with a hole 39 in alignment with the hole 12 and for receiving the end of the guide pin.

A sharp blow or a succession of sharp blows is or are then struck on the end of the handle 34 and the die 32 cuts out a disc from the sheet leaving a hole of the desired size.

It will be appreciated that the dies may be formed to cover any convenient range of sizes but in one arrangement given solely by way of an example, the recess 11 is of internal diameter three inches, whilst the recess 15 is of two and three quarter inches internal diameter and the eight male dies cover a range of from one and a quarter inches in the case of the die 23 increasing in steps of a quarter of an inch up to three inches in the case of the die 30.

For complete co-operation with the eight male dies the six female dies 17 to 22 are of the following dimensions:—

The dies 20, 21 and 22 are each of three inch external diameter, the internal diameters being respectively two inches, two and a quarter and two and a half inches, whilst the dies 17, 18 and 19 are each of two and a quarter inches external diameter, the internal diameters being respectively one and a quarter inches, one and a half inches and one and three quarter inches.

The male dies 23 to 28 co-operate respectively with the female dies 17 to 22, the recess 15 forms the female die for co-operation with the male die 29 and the recess 11 forms the female die for co-operation with the male die 30.

A hole of any size within the above range can be cut out of a sheet by using the corresponding male and female dies and a washer of external diameter corresponding with any of the male dies can be provided with a hole of any smaller diameter within the range of the apparatus. A washer can be provided with a hole of diameter corresponding with that of the guide pin which, in the particular example above described, may be half an inch, and in this case the pointed end of the guide pin forms the male cutting die and the edge of the hole 12 in the master die forms the female cutting die.

It is thus possible to cut a large range of washers of different combinations of internal and external diameters.

The above specific example is only given as one illustration of the scope of the invention and it will be appreciated that by varying the internal and external diameters of the female die rings and by providing corresponding male dies the range of the apparatus can be varied in any desired manner.

The dies can, of course, be formed to cut holes, rings or discs on metric standards or with fractional differences between successive dies other than those specifically mentioned above.

It will be appreciated that to form a washer the operations above referred to for cutting a hole are carried out and a further punching operation is performed upon the disc which has been cut from the sheet, provided, of course, that the diameter of the hole in the washer is required to be greater than that of the hole formed for the guide pin 35, the appropriate dies being used for this further punching operation so as to form in the center of the disc a hole of the desired diameter.

Further washers can be cut from the blank thus removed from the centre of the disc and successively smaller washers can be cut without any waste whatever, since there is little, if any, distortion of the disc removed from the centre in each case.

Figure 5:
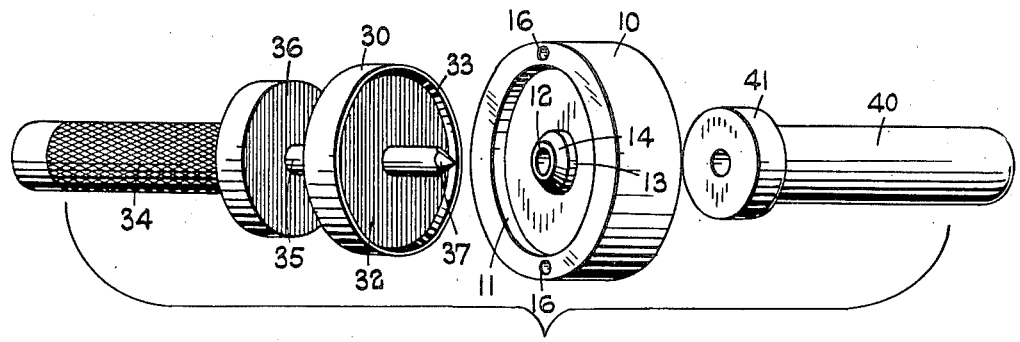
Figure 5 is a perspective view of the apparatus arranged for operating on a vertical sheet or for cutting in a horizontal direction.

For horizontal cutting or for use where it is impossible to support the master die upon a wood block or the like, a hold-up piece indicated at 40 in Figure 5 is applied behind the sheet to be cut so as to form an anvil.

This hold-up piece includes a stem which can be gripped in the hand and at one end of this stem an enlarged disc or collar 41 to form an anvil face, a hole being bored axially through the stem to receive the end of the guide pin.

In the method of operation illustrated in Figure 5 the appropriate male die is placed upon the guide pin 35 and against the collar 36 and the guide pin is then passed through a hole formed in the sheet to be cut as has been described above.

The master die with, if necessary, the female die corresponding with the male die used, is then placed on the end of the guide pin projecting through the hole in the sheet to be cut and the hold-up piece is applied behind the master die.

A blow or succession of blows on the end of the handle with suitable pressure applied to the hold-up piece then completes the piercing operation.

Figure 6:
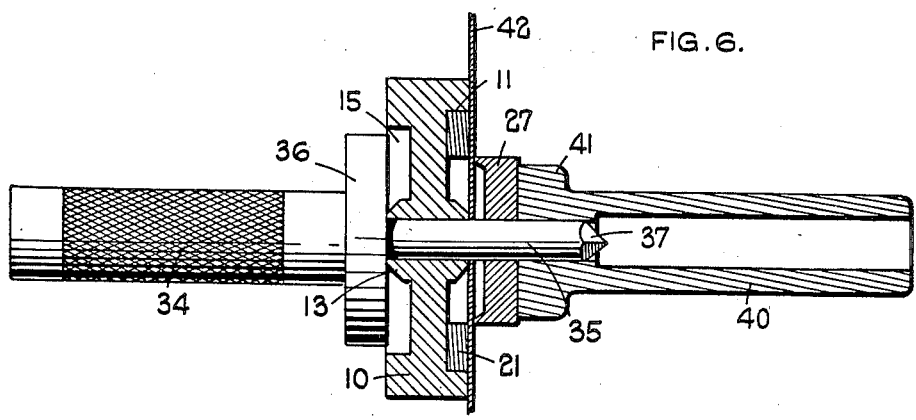
Figure 6 shows in section a further alternative mode of using the apparatus.

In the modified method indicated in Figure 6 the master die is placed on the guide pin and against the collar 36, the guide pin then being passed through a hole in the sheet 42 to be pierced after which the appropriate male die and hold-up piece are applied in succession over the end of the guide pin and the piercing operation is completed by striking a blow or blows on the end of the hold-up piece with suitable pressure applied to the handle 34.

The boss 13 on the master die prevents the cutting edge of the male die striking the base of the recess in the master die and reduces the possibility of the male die jamming in the female die.

The chamfering of the top or outer surface of the boss 13 may be arranged so as slightly to distort the disc of metal cut out by the male die and thus facilitate removal of this disc from the female die.

Figure 7:
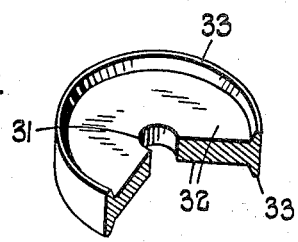
Figure 7 is a perspective view partly in section of an alternative form of master die for use in the apparatus as shown in Figures 1 to 6.

In Figure 7 is indicated a modified male die provided with a recess 32 in each flat face so as to form two cutting edges 23, each of which corresponds with the cutting edge of the dies illustrated in Figures 1 to 6.

Figure 8:
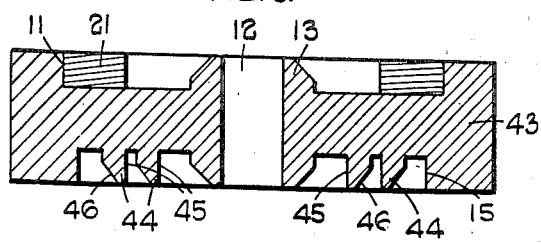
Figure 8 shows in section a modified form of master die.

In Figure 8 is illustrated a modified form of master die 43 which in one flat face is formed with a recess 11 as described with reference to Figures 1 to 6, whilst in the other flat face are formed a succession of concentric annular grooves between which are annular portions constituting female dies for co-operation with male dies such as shown in Figure 2.

The recess 11 is formed to co-operate with the die 30 and to receive the female die rings 17 to 22 as described with reference to Figures 1 to 6 and the operation of this part of the die is as described above.

Each of the annular grooves in the opposite flat face of the master die 43 has an outer peripheral face of parallel sided form to constitute a female cutting edge for co-operation with the appropriate male die and an inner peripheral face of part conical form substantially corresponding with the face 14 of the boss 13 in the master die shown in Figure 1.

The outermost annular groove forms in effect a parallel sided recess 15 corresponding with that of the master die 10 in Figure 4, whilst within this recess are a number of concentric rings 44 integral with the master die and forming a succession of female dies permanently mounted in position in the master die.

Each of these rings 44 has an inner peripheral face 45 of parallel sided form to form the female die for co-operation with a corresponding male die and an outer peripheral face 46 of inclined or part-conical form to provide the necessary clearance between this face and the working face of the next succeeding ring 44.

The master die is provided with bosses 13 as in the case of the die 10.

The male dies are used with these integral rings 44 exactly as described with reference to the removable rings 17 to 22, the only difference being that when the rings 44 of the master die are used the female dies are all integral with the master die instead of being removable as described above and it is only necessary to select the correct male die and assemble this die together with the master die and the sheet to be cut, upon the guide pin as described with reference to Figures 1 to 6.

For cutting countersunk holes in a sheet of metal a hole for the guide pin is formed as above described and the apparatus is threaded up using a male die of the size of the desired hole, but with a female die ring of one size larger and one or two light blows depresses the material around the punch to form the countersinking. The operation is then repeated using the die ring corresponding with the punch above referred to and the hole is cut as previously described, whilst the first operation countersinks the material around this hole.

The apparatus can be used with any thin sheet material such as metal, wood, cardboard, felt, mica, Celluloid or cork and with any of these materials a succession of washers of successively smaller diameter can be cut from a single piece of material.

When cutting thin material, particularly mica, Celluloid or cork, a bedding of felt, rubber or other resilient material may be provided within the female die to support the material being cut and to prevent cracking or fracture during the cutting operation.

The female rings will cut from either side when of parallel sided form but if desired a small rake or inclination may be formed on the side of the die constituting the cutting edge in which case the ring can be used only from one side.

With this apparatus the range can readily be extended without altering the master die or the holder for the male dies, since male and female dies of the desired size can be applied easily to the existing master die and guide pin. Further, in the event of any male die or female ring being damaged or broken a replacement can readily be obtained and fitted in the apparatus.

The dies, however, will last indefinitely in normal use, since the guide pin is in use located positively in the hole in the master die so that the cutting operation is always performed in a satisfactory manner and there is little danger of either the female or male dies being damaged due to faulty or negligent use.

Whilst the apparatus is specifically designed for cutting circular discs, washers or holes it may be designed for cutting any other shapes and the female and male dies may be formed in any convenient manner to cut out washers, pieces or holes of the required shape and size.

What I claim then is:—

1. Apparatus for cutting sheet material including a master die, said master die having in one flat face a recess, a plurality of different female dies, each of said female dies comprising an annular ring, certain of said female dies being adapted removably to fit directly in the recess in said master die, whilst further female dies are adapted for nesting engagement one within another, said female dies when in position fitting flush with said face of the master die, a plurality of male dies each adapted for co-operation with a corresponding female die, a holder for said male dies, a guide pin on said holder, a piercing point on the projecting end of said guide pin, said master die having a hole to receive said guide pin, said piercing point being adapted for co-operation with the edge of said hole to form, in the material being operated on, a hole for the passage of the guide pin and said male dies being adapted to be mounted removably on said holder.

2. Apparatus for cutting sheet material including a master die, said master die having a recess in each of two opposite flat faces and having a hole extending completely through said die at the centre of said recess, a plurality of different female dies adapted removably to fit in the recess in said master die, said female dies when in position fitting flush with said face of the master die, a plurality of male dies each adapted for cooperation with a corresponding female die, a holder for said male dies, a guide pin on said holder, said guide pin being engageable in the hole in said master die, a piercing point on the projecting end of said guide pin, said piercing point being adapted for co-operation with the edge of said hole to form, in the material being operated on, a hole for the passage of the guide pin and said male dies being adapted removably to fit on said guide pin for co-operation with said female dies.

3. Apparatus for cutting sheet material including a master die, said master die having in one flat face a recess and having a hole at the centre of said recess, a projecting boss in said recess and extending around said hole, a plurality of different female dies, each of said female dies comprising an annular ring, certain of said female dies being adapted removably to fit directly in the recess in said master die, whilst further female dies are adapted for nesting engagement one within another, said female dies when in position fitting flush with said face of the master die, a plurality of male dies each adapted for co-operation with a corresponding female die, a holder for said male dies, a guide pin on said holder, said male dies being adapted removably to fit on said guide pin for co-operation with said female dies, a collar on said holder forming an abutment for the male die being used, said guide pin being a sliding fit in the hole in said master die and being guided therein and a piercing point on the projecting end of said guide pin, said piercing point being adapted for co-operation with the edge of said hole to form, in the material being operated on, a hole for the passage of the guide pin.

4. Apparatus for cutting sheet material including a master die, said master die having a recess and having a hole at the centre of said recess, a projecting boss in said recess and extending around said hole, a plurality of different female dies, each of said female dies comprising an annular ring, certain of said female dies being adapted removably to fit directly in the recess in said master die, whilst further female dies are adapted for nesting engagement one within another, said female dies when in position fitting flush with said face of the master die, a plurality of male dies each adapted for co-operation with a corresponding female die, each of said male dies comprising a flat disc with a hole formed centrally therethrough, a holder for said male dies, a guide pin on said holder, a collar on said holder at the inner end of said guide pin, the projecting end of said guide pin being shaped to form a piercing point, each male die being adapted to be mounted removably on said holder against said collar and with the guide pin extending through the hole in said male die, said guide pin being a sliding fit in the hole in said master die and being guided therein and said piercing point being adapted for co-operation with the edge of said hole to form, in the material being operated on, a hole for the passage of the guide pin.

5. Apparatus for cutting sheet material including a master die, said master die having in one flat face a recess and having a hole at the centre of said recess, a projecting boss in said recess and extending around said hole, a plurality of different female dies, each of said female dies comprising an annular ring, certain of said female dies being adapted removably to fit directly in the recess in said master die, whilst further female dies are adapted for nesting engagement one within another, said female dies when in position fitting flush with said face of the master die, a plurality of male dies each adapted for co-operation with a corresponding female die, each of said male dies comprising a flat disc with a hole formed centrally therethrough, a holder for said male dies, a guide pin on said holder, a handle in axial alignment with the guide pin, a collar at the junction between said handle and said guide pin, the projecting end of said guide pin being shaped to form a piercing point, the inner peripheral edge of the projecting boss on the master die forming a female die adapted for co-operation with said piercing point to form, in the material being operated on, a hole for the passage of the guide pin, each male die being adapted to be mounted removably on said holder against said collar and with the guide pin extending through the hole in said male die, said guide pin being adapted to be passed through the hole in said master die and a hold-up piece to be applied to the projecting end of the guide pin, said hold-up piece including a stem having at one end a flange forming an anvil face and bored axially to receive the end of the guide pin.

6. Apparatus for cutting sheet material including a master die, said master die comprising a flat block having two opposite flat faces recessed in axial alignment and having a hole extending therethrough centrally of the recesses in said flat faces, a projecting boss in each recess around the hole therein, a plurality of female die rings integral with said master die and disposed concentrically in the recess in one flat face, a plurality of different female dies each comprising an annular ring, certain of said female dies being adapted removably to fit directly in the recess in the other flat face of said master die, whilst further female dies are adapted for nesting engagement one within another, said female dies when in position fitting flush with said face of the master die, a plurality of male dies each adapted for co-operation with a corresponding female die, a holder for said male dies, a guide pin on said holder, each male die being adapted removably to fit on said guide pin, said guide pin being a sliding fit in the hole in said master die and being guided therein and a piercing point on the projecting end of said guide pin, said piercing point being adapted for co-operation with the edge of said hole to form, in the material being operated on, a hole for the passage of the guide pin.

7. Apparatus for cutting sheet material including a master die, said master die comprising a flat block having two opposite flat faces recessed in axial alignment and having a hole extending therethrough centrally of the recesses in said flat faces, a projecting boss in each recess around the hole therein, a plurality of female die rings integral with said master die and disposed concentrically in the recess in one flat face, a plurality of different female dies each comprising an annular ring, certain of said female dies being adapted removably to fit directly in the recess in the other flat face of said master die, whilst further female dies are adapted for nesting engagement one within another, a plurality of male dies each adapted for co-operation with a corresponding female die, each of said male dies comprising a flat disc with a hole formed centrally therethrough, a holder for said male dies, a guide pin on said holder, a handle in axial alignment with the guide pin, a collar at the junction between said handle and said guide pin, each male die being adapted to be mounted removably on said holder against said collar and with the guide pin extending through the hole in said male die, said guide pin being adapted to be passed through the hole in said master die, and a hold-up piece to be applied to the projecting end of the guide pin, said hold-up piece including a stem having at one end a flange forming an anvil face and bored axially to receive the end of the guide pin.

JOSEPH JAMIESON.